Benj Arnold's
Impd. Twist-Drill Machine.

118179  PATENTED AUG 22 1871

Witnesses.
Jas. E. Arnold.
H. A. Arnold.

Inventor.
Benjamin Arnold.

118,179

UNITED STATES PATENT OFFICE.

BENJAMIN ARNOLD, OF EAST GREENWICH, RHODE ISLAND.

IMPROVEMENT IN MACHINES FOR SLOTTING THE SHANKS OF TWIST-DRILLS.

Specification forming part of Letters Patent No. 118,179, dated August 22, 1871.

*To all whom it may concern:*

Be it known that I, BENJAMIN ARNOLD, of East Greenwich, in the county of Kent and State of Rhode Island, have invented certain new and useful Improvements in Slotting the Back or Holding-Ends of Twist-Drills, Reamers, and other like Tools, of which the following is a specification:

The object of this invention is to facilitate the cutting of accurately-spaced slots in the shanks of twist-drills, reamers, &c., for the purpose of holding those tools more firmly in the self-centering chucks, now so generally in use, without being obliged to use a wrench to tighten the chuck. This object is accomplished by placing three cutters in sliding carriages on the face of a plate, the cutters being placed in radial positions, equidistant from each other and a common center, and the plane of motion of the cutters being parallel to the center line of the tool to be slotted. The invention further consists in devices for keeping the cutter-shafts or arbors in gear when moved apart or brought closer together for the purpose of cutting larger or smaller articles; also, in devices for moving the cutters in and out from the common center, and a carriage for feeding the drill into the cutters.

Figure 1:
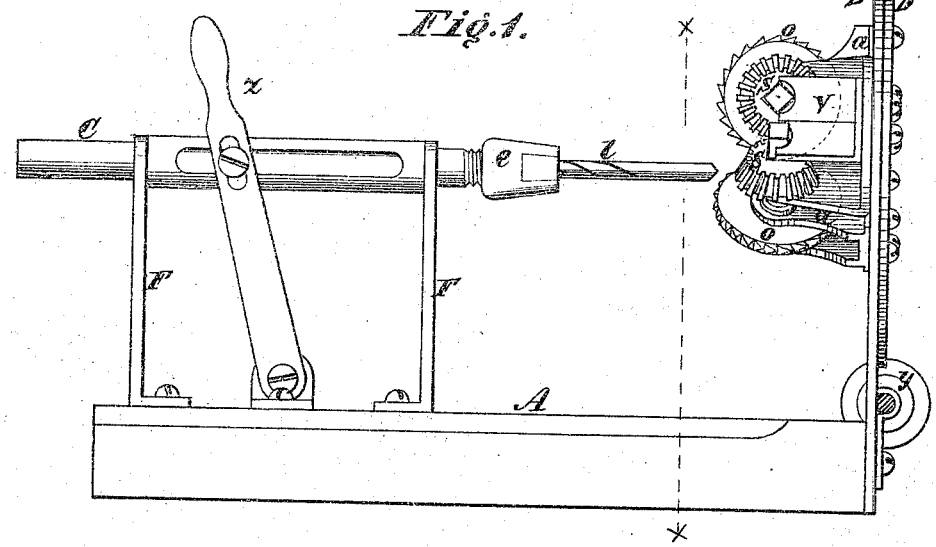
Figure 2:
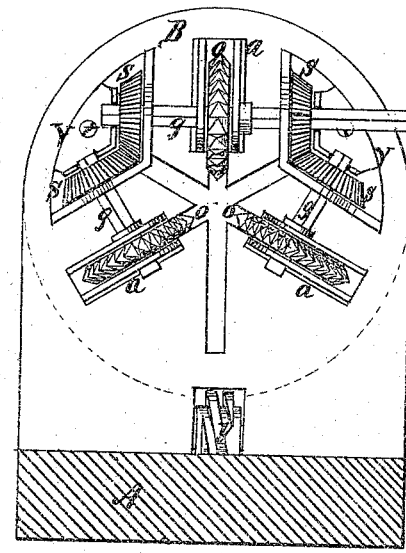
Figure 3:
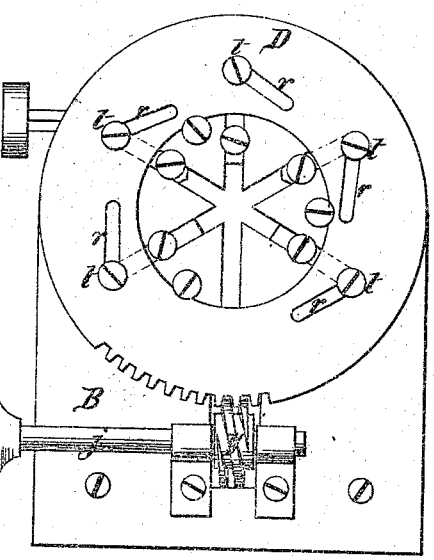

Figure 1 shows a front elevation. Fig. 2 shows a vertical transverse section in direction of line $x\,x$, Fig. 1, and looking to the right. Fig. 3 shows an elevation of the right-hand end of Fig. 1.

B is a vertical plate, of metal, secured to the bed or table A, and having slots radiating from its center, in three of which slots carriages $a\,a\,a$ are fitted to slide closely and easily. These carriages hold the cutters $o\,o\,o$, which are fastened on arbors $g\,g$ turning in bearings in the sides of the carriages. The three cutter-arbors are geared together by means of four bevel-gear wheels, S S S S, which are free to slide on the arbors, but at the same time are prevented from turning without carrying the arbors by being squared onto them; or a spline in the arbor may be used, or other common methods of accomplishing this object. These bevel-gear wheels are kept in their proper relative positions with regard to each other while the cutter-carriages move in or out by the carriages V V, which hold the gears together and oblige the arbors to slide through them; and the sliding motion of the bevel-gears S on their arbors, together with their radial motion, makes it necessary to move the carriages V V much faster than the cutter-carriages $a\,a\,a$ to and from the center in setting the cutters for different sizes of drills, to keep the bevel-gears S in gear with each other. Another plate, D, is placed back of plate B and secured to it so as to be free to turn a part of a revolution around the same center that the cutters are arranged to. In this plate D are made involute slots $r\,r\,r$, or in a diagonal position to the slots in the plate B, with which they correspond, and pins or screws $t\,t\,t$ are put through the slots in the two plates B and D and made fast in the carriages $a\,a$ V V, so that when the plate D is turned on the plate B the carriages will be moved in and out from the center by the diagonal slots $r\,r$, the slots that move the carriages V V being made at an angle more nearly radial to the center of the plate than those that move the carriages $a\,a$, that the former may move faster in and out than the latter, as heretofore explained. For the purpose of cutting large and small drills, a worm-wheel, $y$, is fastened to a small shaft, $j$, the bearings of which are fast on the plate B. This worm-wheel meshes into teeth cut on the periphery of the plate D, and by turning the shaft and worm-wheel $y$ the plate D will be turned so as to move the carriages in and out. A mandrel, C, is fitted to slide in the standards F F, the center of the mandrel being made to agree with the center around which the cutters are arranged. A chuck, $e$, or other device is fast on the end of the mandrel C to hold the drill $l$ or other tool to be slotted. A lever, $z$, is pivoted to the bed A, and a pin in the mandrel passes through a slot in the lever. When the lever is moved backward and forward the mandrel is also moved, and the drill $w$ in the chuck will be pushed in between the cutters, which, being put in motion by a belt on the pulley J, will cut the three slots at one operation, when by drawing back the lever and loosening the chuck the drill can be taken out and another inserted to undergo the same operation.

In cutting most sizes of tools the cutters will support the drill or piece being cut against each other, but when other supports or guides are found necessary they may be attached to the sliding carriages so as to travel in and out with them or placed in other carriages.

By this machine the drills, &c., may be slotted with accuracy and great rapidity with but merely nominal increase in the cost; at the same time their value is much enhanced.

What I claim as my invention is—

1. The combination of the cutters o o o, arbors g g g, bevel-gear wheels S S S S with the carriages V V, and plate B, substantially as specified, and for the purpose herein set forth.

2. The combination of the worm-wheel y with the plates D B and the carriages V V and a a a, and arbors g with gear-wheels S' S', all being arranged and operating substantially as and for the purpose set forth.

3. The combination of the carriages a a and V V with the plate B and movable plate D, the latter being provided with slots r r, substantially as described, and for the purpose set forth.

BENJAMIN ARNOLD.

Witnesses:
JAS. E. ARNOLD,
FRANK H. ARNOLD.